W. H. ELMER.
BELT FASTENER.
APPLICATION FILED JULY 3, 1912.
1,074,612.
Patented Oct. 7, 1913.
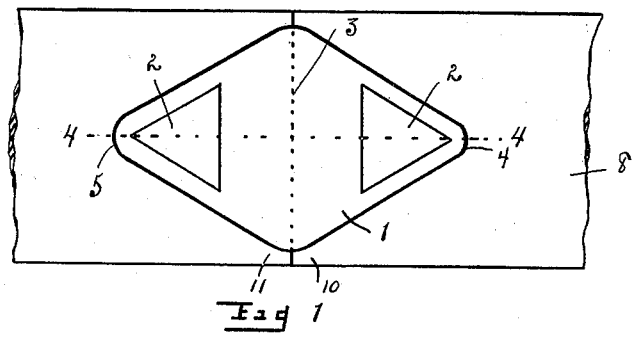
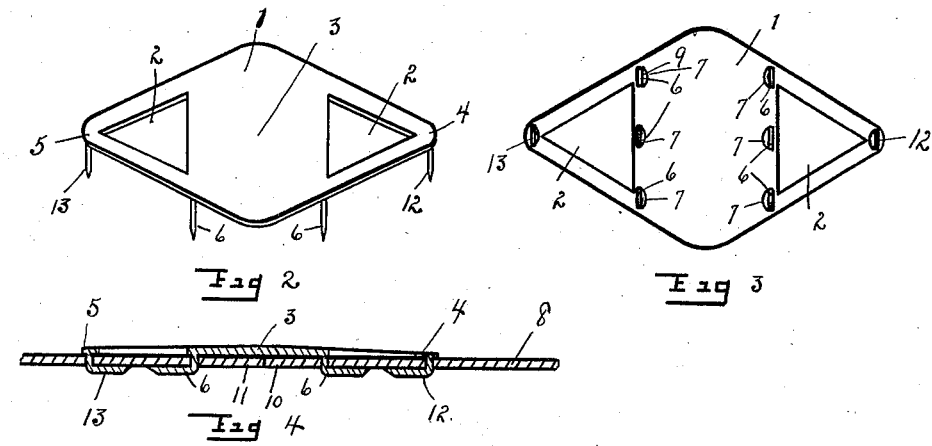
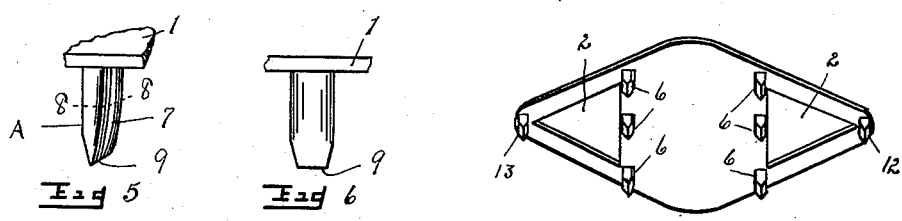
WITNESSES:
INVENTOR
WILLIAM H. ELMER
BY Thomas L. Wilder
ATTORNEY

UNITED STATES PATENT OFFICE.

WILLIAM H. ELMER, OF NEW HARTFORD, NEW YORK.

BELT-FASTENER.

1,074,612. Specification of Letters Patent. Patented Oct. 7, 1913.

Application filed July 3, 1912. Serial No. 707,441.

*To all whom it may concern:*

Be it known that I, WILLIAM H. ELMER, a citizen of the United States, residing at the village of New Hartford, in the county of Oneida and State of New York, have invented certain new and useful Improvements in Belt-Fasteners, of which the following is a specification, reference being had therein to the accompanying drawing.

My invention relates to a belt fastener, and I declare the following to be a full, clear, concise, and exact description thereof sufficient to enable any one skilled in the art to which it appertains to make and use the same, reference being had to the accompanying drawings in which like reference characters refer to like parts throughout the specification.

The object of the invention is to provide a simple, efficient device, whereby the ends of a belt, such as are employed upon pulleys to turn shaftings, may be quickly united in a manner that will obviate any tearing of the engaged portions of the belt. Heretofore, belt fasteners have been of little service in the art, because of the harmful tendency that they have of tearing the belt. This harmful feature is avoided in the fastener disclosed in the drawings.

Other features will also appear by referring to the drawings in which:

Figure 1 is a top plan view of the belt fastener, showing fragments of the belt; Fig. 2 is a perspective view of the fastener; Fig. 3 is a bottom plan view of the fastener; Fig. 4 is a longitudinal section taken on the line 4—4 of Fig. 1; Fig. 5 is an enlarged detail view in perspective of a tooth employed; Fig. 6 is a front elevation of the tooth shown in Fig. 5; Fig. 7 is a perspective view of the fastener, looking at the under surface thereof; Fig. 8 is a transverse section of a tooth taken on line 8—8 of Fig. 5.

Referring more particularly to the drawings, the belt fastener comprises a body portion —1—, which may be made of metal or other suitable material adapted for the purpose. In order to give flexibility, particularly in a longitudinal direction, to plate —1—, so that said plate will easily bend to conform to the curved surface of a pulley, said plate —1— is made of quadrilateral shaped form. The yielding feature is further effected by forming recesses 2—2 in either end of plate —1— and by having the maximum thickness of plate —1— in the center portion as at 3, which thickness gradusually tapers toward both ends 4 and 5, respectively, where the thickness is at a minimum.

From the under surface of plate —1—, there project a plurality of teeth 6, each having a curved surface 7 on the side that encounters the greatest strain from the belt. The curved surface 7 of teeth 6 avoid the tearing or shredding of the adjacent portions of the belt 8. The side opposite or side A is formed with a flat surface, whereby the hole made by the tooth in belt 8, will encompass as small a space as possible, to avoid weakening belt 8. Teeth 6 are provided with sharp edges 9, so that they may easily penetrate belt 8, when assembling the fastener.

In order to steady the ends 10 and 11 of belt 8, and thereby prevent any wabbling of said ends, when belt 8 is in action, there is embodied a tooth 12 and a tooth 13, similar in all respects as teeth 6, and disposed at either end of plate —1—. Teeth 12 and 13 are located centrally in the rear of teeth 6—6—6. When the fastener is applied to the ends 10 and 11 of a belt as 8, teeth 6, 12 and 13 are forced into the leather and then bent parallel with the adjacent surface thereof. In the event, that it is found desirable to remove belt 8 from the pulley and shaftings, teeth 6, 12 and 13 may be easily bent into open position, whereby the fastener can be easily removed to be subsequently replaced on the same or a different belt. When teeth 6, 12 and 13 are folded over, the flat surface —A— thereof will lie adjacent the surface of the pulley that contacts with said belt.

Having thus described my invention, what I claim as new and desire to secure by Letters Patent is:

1. In a belt fastener of the character described, a plate, said plate having a quadrilateral shape, and a maximum thickness in the center portion thereof, teeth projecting from said plate, whereby to engage the end portions of a belt, said teeth having curved surfaces to prevent said teeth from tearing said belt, and said plate having triangular shaped recesses, whereby to aid said plate to bend to conform to the curved surface of a pulley.

2. In a belt fastener, a flexible plate having a quadrilateral shape, a thickness tapering from its center portion toward either end thereof, and triangular shaped recesses in either end, whereby to aid said plate to bend, teeth disposed in rows adjacent the center portion of the plate, and adapted to engage the ends of a belt, and a tooth disposed at either end of the plate, whereby to steady the grip of the first mentioned teeth on the ends of the belt and thereby prevent said belt from wabbling.

3. In a belt fastener, a flexible plate having a quadrilateral shape, a thickness tapering from its center portion toward either end thereof, and triangular shaped recesses in either end, whereby to aid said plate to bend to conform to the curved surface of a pulley, two rows of teeth disposed adjacent the center and wider portion of said plate, a tooth disposed at either end of the plate, whereby to steady the pull of the aforementioned teeth when the plate is secured to a belt, and said teeth having curved surfaces adjacent the edge thereof against which the pull of the belt is exerted, to thereby prevent said teeth from tearing said belt, substantially as described.

In testimony whereof I have affixed my signature in the presence of two witnesses.

WILLIAM H. ELMER.

Witnesses:
DAVID B. LISLE,
SAMUEL SLOAN.

---

Copies of this patent may be obtained for five cents each, by addressing the "Commissioner of Patents, Washington, D. C."